United States Patent [19]

Lenz

[11] 3,926,962
[45] Dec. 16, 1975

[54] 6α-CARBOXYMETHYL-17-HYDROXY-3-OXO-17α-PREGN-4-ENE-21-CARBOXYLIC ACID γ-LACTONE AND INTERMEDIATES THERETO

[75] Inventor: George R. Lenz, Glenview, Ill.

[73] Assignee: G. D. Searle & Co., Chicago, Ill.

[22] Filed: July 15, 1974

[21] Appl. No.: 488,446

[52] U.S. Cl. ............................................ 260/239.57
[51] Int. Cl.² .......................................... C07J 19/00
[58] Field of Search ............................... 260/239.57

[56] References Cited
UNITED STATES PATENTS
3,845,041   10/1974   Chenn ........................... 260/239.57

*Primary Examiner*—Elbert L. Roberts
*Attorney, Agent, or Firm*—John M. Brown

[57] ABSTRACT

The anti-DCA activity of 6α-carboxymethyl-17-hydroxy-3-oxo-17α-pregn-4-ene-21-carboxylic acid γ-lactone and its preparation are disclosed.

6 Claims, No Drawings

6α-CARBOXYMETHYL-17-HYDROXY-3-OXO-17α-PREGN-4-ENE-21-CARBOXYLIC ACID Γ-LACTONE AND INTERMEDIATES THERETO

This invention relates to 6α-carboxymethyl-17-hydroxy-3-oxo-17α-pregn-4-ene-21-carboxylic acid γ-lactone, intermediates thereto, and processes for their preparation. More particularly, this invention provides a new, useful, and unobvious steroid having the formula

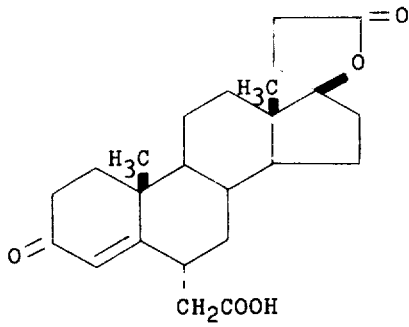

The enformulated compound is useful by reason of the valuable biological properties which inhere therein. For example, it is adapted to reverse the effects of desoxycorticosterone acetate (DCA) on urinary sodium and potassium, and as such is diuretic. Also useful, therefor, are the intermediates whereby 6α-carboxymethyl-17-hydroxy-3-oxo-17α-pregn-4-ene-21-carboxylic acid γ-lactone can be prepared.

Equivalent to the lactones contemplated herein are the corresponding hydroxy acids and their salts and esters prepared in situ during the course of the processes hereinafter exemplified or readily accessible via procedures well-known in the art. Typical of these equivalent compounds are the alkali, alkaline earth, and ammonium salts, and lower alkyl esters. Likewise equivalent to the foregoing compounds are such alkali, alkaline earth, and ammonium salts, as also lower alkyl esters in addition to the methyl esters specifically exemplified, wherein the salt formation or esterification involves a 6-carboxymethyl substituent within the purview of this disclosure. By "lower alkyl" is meant methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight- or branched-chain hydrocarbon grouping of the formula $$-C_nH_{2n+1}$$

wherein $n$ represents a positive integer less than 8. The terms "lower alkanoyl" and "lower alkoxy" as used hereinafter refer to radicals which can be represented as

and

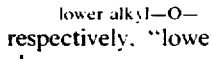

respectively, "lower alkyl" therein being defined as above.

A standardized test for the capacity of a compound to reserve the renal electrolyte effects of DCA, substantially as described by C. M. Kagawa in chapter 34 of volume II of "Evaluation of Drug Activities: Pharmacometrics," edited by D. R. Laurence and A. L. Bacharach, can be carried out as follows: A group (Group I) of 8 male Charles River rats, each weighing between 150 and 200 gm is adrenalectomized and maintained thereafter on sugar cubes and tap water ad libitum overnight. Each animal is thereupon subjected to these successive treatments: (a) 0.012 mg of DCA dissolved in 0.1 ml of corn oil is injected subcutaneously; (b) 2.4 mg of test compound dissolved or suspended in 0.5 ml of corn oil or other physiologically inert solvent (e.g., aqueous 0.9% sodium chloride) is administered subcutaneously or intragastrically; (c) 2.5 ml of aqueous 0.9% sodium chloride is injected subcutaneously. Urinary sodium and potassium are measured by customary techniques on samples or urine collected during the 4 hr. immediately following treatment. Controls are provided by second and third groups of 8 each 150–200 gm rats concurrently and identically treated excepting that in Group II, 0.33 mg of spironolactone is substituted for the test compound and the solution thereof is injected subcutaneously, while in Group III neither test compound nor spironolactone is administered. DCA produces sodium (Na) retention, loss of potassium (K), and a corresponding reduction in the mean log Na × 10/K. Spironolactone serves as an index of the validity of the test, the dose of 0.33 mg having been shown [Hofmann et al., Arch. intern. pharmacodynamie, 165, 476 (1967)] to induce a 50% reversal of the effects of the DCA. Kagawa [Endocrinology, 74, 724 (1964)] reported a standard error of ±0.084 per 4-rat response, determined from a large number of tests and based on 60° of freedom, for the mean log Na × 10/K measurement. From this it can be calculated that the least significant difference (P < 0.05) in mean log Na × 10/K between 2 groups of 8 rats each is ± 0.168. It follows that when mean log Na × 10/K for Group I is equal to or greater than that for Group II, and the latter in turn exceeds the value for Group III by at least 0.168 log units, the reversals of the renal electrolyte effects of DCA represented thereby are significant. A compound active at the 2.4 mg dose level is retested at lower doses until the median effective dose (MED), a dose in mg sufficient to produce a 50% inhibition of the renal electrolyte effects of the DCA administered, can be calculated. The subcutaneous MED of 6α-carboxymethyl-17-hydroxy-3-oxo- 17α-pregn-4-ene-21-carboxylic acid γ-lactone in the foregoing test was found to be 1.85 mg.

Those skilled in the art will recognize that observations of activity is standardized tests for particular biological effects are fundamental to the development of valuable new drugs, both veterinary and human.

6α-Carboxymethyl-17-hydroxy-3-oxo-17α-pregn-4-ene-21-carboxylic acid γ-lactone can be prepared as follows: A 6-cyanomethylene-5α,17-dihydroxy-3β-[(lower alkanoyl)oxy]-17α-pregnane-21-carboxylic acid γ-lactone is subjected to low pressure hydrogenation in ethanol, using 5% palladium-on-carbon as catalyst. The resultant 6β-cyanomethyl corresponding ester is hydrolyzed by prolonged heating with potassium hydroxide in ethylene glycol. The carboxyl in the 6β-carboxymethyl-3β, 5α, 17-trihydroxy-17α-pregnane-21-carboxylic acid γ-lactone which eventuates is esterified via prolonged contact with a lower alkyl iodide and sodium hydrogen carbonate in N,N-dimethylformamide, and the 3β-hydroxyl in the 3β, 5α,17-trihydroxy-6β-[(lower alkoxy) carbonylmethyl]-17α-pregnane-21-carboxylic acid γ-lactone so obtained is oxidized to oxo with Jones' reagent (prepared by dissolving 10 parts of chromium trioxide in 20 parts of water and adding to the solution, consecutively, 15 parts of concentrated sulfuric acid and 20 parts of water) in acetone. The resultant 5α,17-dihydroxy-6β-[(lower alkoxy)carbonylmethyl]-3-oxo-17α-pregnane-21-carboxylic acid γ-lactone, upon heating with alumina in toluene, affords a mixture of 17-hydroxy-6β-[(lower alkoxy)carbonylmethyl]-3-oxo-17α-pregn-4-ene-21-carboxylic acid γ-lactone and the 6α-isomer thereof, separable by chromatography, from either of which, by saponifying with potassium hydroxide in aqueous methanol, 6α-carboxymethyl-17-hydroxy-3-oxo-17α-pregn-4-ene-21-carboxylic acid γ-lactone is obtained.

Alternatively, 6β-carboxymethyl-3β,6α,17-trihydroxy-17α-pregnane-21-carboxylic acid γ-lactone can be contacted with Jones' reagent in acetone, and the resultant 6βcarboxymethyl-5α,17-dihydroxy-3-oxo-17α-pregnane-21-carboxylic acid γ-lactone heated with alumina in toluene to produce 6α-carboxymethyl-17-hydroxy-3-oxo-17α-pregn-4-ene 21-carboxylic acid γ-lactone.

A second variant of the firstly disclosed procedure for preparing 6α-carboxymethyl-17-hdyroxy-3-oxo-17α-pregn-4-ene-21-carboxylic acid γ-lactone proceeds by saponifying a 6β-cyanomethyl-5α,17-dihydroxy-3β-[(lower alkanoyl)oxy]-17α-pregnane-21-carboxylic acid γ-lactone via contact at room temperature with sodium hydroxide in methanol. The resultant 6β-cyanomethyl-3β, 5α,17-trihydroxy-17α-pregnane-21-carboxylic acid γ-lactone is contacted with Jones' reagent in acetone to oxidize the 3β-hydroxyl to oxo; and the 6β-cyanomethyl-5α,17-dihydroxy-3-oxo-17α-pregnane-21-carboxylic acid γ-lactone so obtained is heated with alumina in toluene to give 6α-cyanomethyl-17-hydroxy-3-oxo-17α-pregn-4-ene-21-carboxylic acid γ-lactone. Upon contacting 6α-cyanomethyl-17-hydroxy-3-oxo-17α-pregn 4-ene-21-carboxylic acid γ-lactone with triethoxymethane in the presence of p-toluenesulfonic acid monohydrate using a cold mixture of dioxane and ethanol as the reaction medium, 6-cyanomethyl-3-ethoxy-17-hydroxy-17α-pregna 3,5-diene-21-carboxylic acid γ-lactone eventuates. The enol ether is then converted to 6α-carboxymethyl-17-hydroxy 3-oxo-17α-pregn-4-ene-21-carboxylic acid γ-lactone by heating with sodium hydroxide in ethylene glycol.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. To a mixture of 5 parts of 57% sodium hydride in mineral oil with 25 parts of 1,2-dimethoxyethane at 0° is added, with stirring, 26 parts of diethyl cyanomethylphosphonate. Stirring at 0° is continued for one-half hour, whereupon 20 parts of 3β-acetyloxy-5α,17-dihydroxy-6-oxo-17α-pregnane-21-carboxylic acid γ-lactone (U.S. Pat. No. 3,012,029) and 200 parts of tetrahydrofuran are consecutively added. Stirring is continued for a further 2 hours during which the reaction mixture is brought to room temperature, at which point it is poured into a solution of 20 parts of concentrated hydrochloric acid in 980 parts of distilled water. The gummy precipitate which forms is isolated by filtration and taken up in 100 parts of hot methanol. The resultant solution is slowly diluted with 300 parts of distilled water. A white crystalline precipitate forms. This material is 3β-acetyloxy-6-cyanomethylene-5α,17-dihydroxy 17α-pregnane-21-carboxylic acid γ-lactone which, filtered off and dried in air, melts at 236°–239°.

B. To a solution of 10 parts of 3β-acetyloxy-6-cyanomethylene-5α,17-dihydroxy-17α-pregnane-21-carboxylic acid γ-lactone in 80 parts of ethanol is added 5 parts of 5% palladium-on-carbon. The resultant mixture is hydrogenated at room temperatures under approximately 4 atmospheres of pressure for 72 hours. Catalyst is thereupon filtered out and washed with chloroform. The washings and filtrate are combined and stripped of solvent by vacuum distillation. The residual gummy solid, upon crystallization from aqueous methanol, affords 3β-acetyloxy- 6β-cyanomethyl-5α,17-dihydroxy-17α-pregnane-21-carboxylic acid γ-lactone as the hemihydrate melting in the range 239°–248°. Water of crystallization is removable by heating in vacuo above the melting point of the hemihydrate.

C. A solution of 1 part of 3β-acetyloxy-6β-cyanomethyl-5α,17 -dihydroxy-17α-pregnane-21-carboxylic acid γ-lactone and 6 parts of potassium hydroxide in 30 parts of ethylene glycol is heated at the boiling point under reflux for 8 hours, then allowed to cool to room temperature and thereupon poured into 500 parts of distilled water. The resultant mixture is acidified with 25 parts of concentrated hydrochloric acid. Insoluble solids are filtered off and dried in air. The product thus isolated is 6β-carboxymethyl-3β,5α, 17-trihydroxy-17αpregnane-21-carboxylic acid γ-lactone.

D. To a solution of 1 part of 6β-carboxymethyl-3β,5α,17-trihydroxy-17α-pregnane-21-carboxylic acid γ-lactone in 10 parts of N,N-dimethylformamide is consecutively added 2 parts of methyl iodide and 2 parts of sodium hydrogen carbonate. The resultant mixture is stirred at room temperatures for 8 hours, then poured into 100 parts of aqueous 5% hydrochloric acid. The mixture thus obtained is extracted with dichloromethane. The dichloromethane extract is dried over anhydrous sodium sulfate and then stripped of solvent by vacuum distillation. The residue, a gum, upon crystallization from aqueous methanol affords 3β,5α,17-trihydroxy-6β-methoxycarbonylmethyl-17α-pregnane-21-carboxylic acid γ-lactone. The product is isolated by filtration and dried in air.

E. To a solution of 1 part of 3β,5α,17-trihydroxy-6β-methoxycarbonylmethyl-17α-pregnane-21-carboxylic acid γ-lactone in 100 parts of acetone at 0° is added 1 part of Jones' reagent. The resultant mixture is stirred for 10 minutes at 0° and thereafter while 1 part of 2-propanol and 100 parts distilled water are consecutively introduced. Organic solvents are then removed by vacuum distillation, and insoluble solids thereupon filtered out of the distilland and dried in air. The product thus isolated is 5α,17-dihydroxy-6β-methoxycarbonylmethyl-3-oxo-17α-pregnane-21-carboxylic acid γ-lactone.

F. To a solution of 1 part of 5α,17-dihydroxy-6β-methoxycarbonylmethyl-3-oxo-17α-pregnane-21-carboxylic acid γ-lactone in 100 parts of toluene is added 5 parts of alumina. The resultant mixture is heated at the boiling point under reflux with stirring for 2 hours, then filtered. The filtrate is stripped of solvent by vacuum distillation, and the residue is crystallized from aqueous methanol to give 17-hydroxy-6α-methoxycarbonylmethyl-3-oxo-17α-pregn4-ene-21-carboxylic acid γ-lactone hemihydrate melting in the range 140°–145°. Water of crystallization is removed by heating in vacuo above the melting point of the hemihydrage. From the crystallization mother liquor, on evaporation of solvent, the 6β isomer is obtained.

G. To a solution of 1 part of 17-hydroxy-6αmethoxycarbonylmethyl-3-oxo-17α-pregn-4-ene-21-carboxylic acid γ-lactone in 40 parts of methanol is added a solution of 4 parts of potassium hydroxide in 120 parts of distilled water. The resultant solution is allowed to stand at room temperatures for 4 hours, whereupon methanol is removed by vacuum distillation. To the distilland is added 10 parts of concentrated hydrochloric acid. The white precipitate which forms is filtered out and dried in air to give 6α-carboxymethyl-17-hydroxy-3-oxo-17α-pregn-4-ene21-carboxylic acid γ-lactone as the hemihydrate melting at 212°–215°. Water of crystallization is removed by heating in vacuo above the melting point of the hemihydrate.

EXAMPLE 2

A. To a suspension of 15 parts of 6β-carboxymethyl-3β,5α,17-trihydroxy-17α-pregnane-21-carboxylic acid γ-lactone in 1500 parts of acetone at 0°–5° is added, with stirring, 10 parts of Jones' reagent. Stirring at 0°–5° is continued for 30 minutes during which solution occurs, and thereafter while 10 parts of 2-propanol and 500 parts of distilled water are consecutively introduced. Organic solvents are removed by vacuum distillation; and the white precipitate which forms is then filtered off, washed with distilled water, and dried in air. The product thus isolated is 6β-carboxymethyl-5α,17-dihydroxy-3-oxo-17α-pregnane-21-carboxylic acid γ-lactone melting at 242°–244°.

B. To a solution of 1 part of 6β-carboxymethyl5α,17-dihydroxy-3-oxo-17α-pregnane-21-carboxylic acid γ-lactone in 100 parts of toluene is added 5 parts of alumina. The resultant suspension is heated, with vigorous stirring, to the boiling point under reflux and maintained thereat for one hour, whereupon the insoluble solids are filtered out and washed with chloroform. Washings and filtrate are combined and stripped of solvent by vacuum distillation. The residue is mixed with 1 part of sodium hydroxide and 10 parts of methanol. The mixture is stirred at room temperature for one-half hour, whereupon 100 parts of 5% hydrochloric acid is introduced. The white precipitate which forms is filtered off and dried in air. The product thus isolated is 6α-carboxymethyl-17-hydroxy-3-oxo-17α-pregn4-ene-21-carboxylic acid γ-lactone.

EXAMPLE 3

A. A solution of 1 part of 3β-acetyloxy-6β-cyanomethyl-5α,17-dihydroxy-17α-pregnane-21-carboxylic acid γ-lactone and 1 part of sodium hydroxide in 10 parts of methanol is allowed to stand at room temperature for 1 hour, whereupon 50 parts of aqueous 5% hydrochloric acid is introduced and solvent then removed by vacuum distillation. Insoluble solids are filtered from the distilland and dried in air. The product thus isolated is 6β-cyanomethyl-3β,5α,17-trihydroxy-17α-pregnane-21-carboxylic acid γ-lactone.

B. To a solution of 4 parts of 6β-cyanomethyl-3β,5α,17-trihydroxy-17α-pregnane-21-carboxylic acid γ-lactone in 400 parts of acetone at 0°–5° is added, with stirring, 5 parts of Jones' reagent. Stirring at 0°–5° is continued for 5 minutes thereafter and while 5 parts of 2-propanol and 50 parts of distilled water are consecutively introduced. Organic solvent is then removed by vacuum distillation. The white crystalline solids are removed from the distilland by filtration and dried in air. The product thus isolated is 6β-cyanomethyl-5α,17dihydroxy-3-oxo-17α-pregnane-21-carboxylic acid γ-lactone.

C. To a solution of 1 part of 6β-cyanomethyl-5α,17-dihydroxy-3-oxo-17α-pregnane-21-carboxylic acid γ-lactone in 100 parts of dry toluene at the boiling point under reflux is added, with stirring, 5 parts of alumina. Stirring at the boiling point under reflux is continued for 1 hour, whereupon insoluble solids are filtered out and washed with chloroform. The washings and filtrate are combined and stripped of solvent by vacuum distallation. The residue is taken up in 25 parts of methanol. To this solution is added 1 part of sodium methoxide. The resultant mixture is allowed to stand at room temperatures for 16 hours, then quenched by diluting with 20 parts of 5% hydrochloric acid. Methanol is removed from the resultant mixture by vacuum distillation. The white crystalline solids, filtered from the distilland and dried in air, are 6α-cyanomethyl-17-hydroxy-3-oxo-17α-pregn-4-ene-21-carboxylic acid γ-lactone melting at 207°–210°.

D. To a mixture of 125 parts of triethoxymethane, 300 parts of dioxane, and 200 parts of ethanol at approximately 5° is added, with stirring, 100 parts of 6α-cyanomethyl-17-hydroxy-3-oxo-17α-pregn-4-ene-21-carboxylic acid γ-lactone, followed by 6 parts of p-toluenesulfonic acid monohydrate. Stirring is continued for 15 minutes thereafter, at which point the reaction mixture is poured into a mixture of 200 parts of pyridine with 9800 parts of distilled water. The mixture thus obtained is extracted with dichloromethane. Solvent is removed from the extract by vacuum distillation. The residue is 6-cyanomethyl-3-ethoxy-17-hydroxy-17α-pregna-3,5-diene-21-carboxylic acid γ-lactone.

E. A solution of 1 part of 6-cyanomethyl-3-ethoxy-17-hydroxy-17α-pregna-3,5-diene-21-carboxylic acid γ-lactone and 2 parts of sodium hydroxide in 10 parts of ethylene glycol is heated at the boiling point under reflux for 4 hours, then cooled and added to a mixture of 10 parts of concentrated hydrochloric acid with 100 parts of distilled water. The mixture thus obtained is stirred for 2 hours, whereupon insoluble solids are filtered out and dried in air. The product thus isolated is 6α-carboxymethyl-17-hydroxy-3-oxo-17α-pregn-4-ene-21-carboxylic acid γ-lactone.

What is claimed is:

1. 6α-Carboxymethyl-17-hydroxy-3-oxo-17α-pregn4-ene-21-carboxylic acid γ-lactone.

2. A compound having the formula

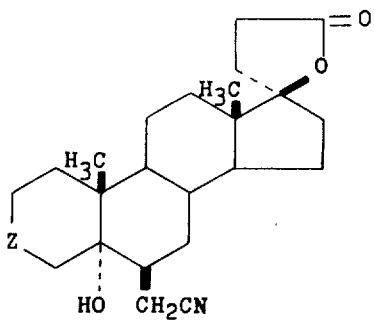

wherein Z represents β-acetyloxymethylene, β-hydroxymethylene, or carbonyl.

3. A compound having the formula

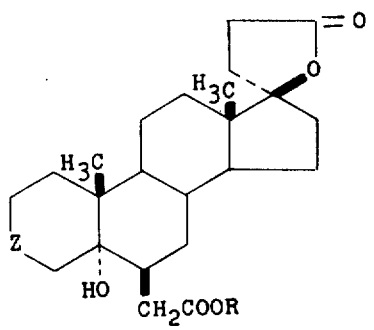

wherein Z represents β-hydroxymethylene or carbonyl and R represents hydrogen or methyl.

4. A compound having the formula

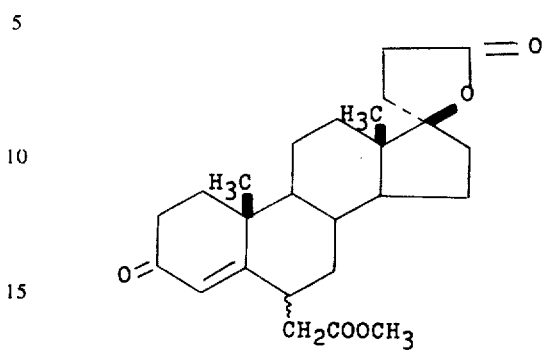

5. 6α-Cyanomethyl-17-hydroxy-3-oxo-17α-pregn4-ene-21-carboxylic acid γ-lactone.

6. 6-Cyanomethyl-3-ethoxy-17-hydroxy-17α-pregna3,5-diene-21-carboxylic acid γ-lactone.

* * * * *